United States Patent
Pelegero et al.

(10) Patent No.: US 10,922,694 B2
(45) Date of Patent: Feb. 16, 2021

(54) AUTOMATIC TELLER MACHINE (ATM) ELECTRONIC PUSH REQUESTS

(71) Applicant: PayPal, Inc., San Jose, CA (US)

(72) Inventors: Rene Mauricio Pelegero, Woodinville, WA (US); Girish Balasubramanian, San Jose, CA (US); Rohan Mahadevan, Menlo Park, CA (US)

(73) Assignee: PayPal, Inc., San Jose, CA (US)

( * ) Notice: Subject to any disclaimer, the term of this patent is extended or adjusted under 35 U.S.C. 154(b) by 247 days.

(21) Appl. No.: 15/726,989

(22) Filed: Oct. 6, 2017

(65) Prior Publication Data
US 2018/0039991 A1    Feb. 8, 2018

Related U.S. Application Data

(63) Continuation of application No. 11/962,733, filed on Dec. 21, 2007, now abandoned.
(Continued)

(51) Int. Cl.
*G06Q 20/10* (2012.01)
*G06Q 20/40* (2012.01)
(Continued)

(52) U.S. Cl.
CPC ............. *G06Q 30/00* (2013.01); *G06Q 20/10* (2013.01); *G06Q 20/40* (2013.01); *G06Q 30/0601* (2013.01)

(58) Field of Classification Search
CPC ....... G06F 3/023; G06Q 20/06; G06Q 10/107
(Continued)

(56) References Cited

U.S. PATENT DOCUMENTS 5,159,592 A    10/1992  Perkins
5,175,416 A *  12/1992  Mansvelt ............... G06Q 40/02
                                                      235/379
(Continued)

FOREIGN PATENT DOCUMENTS

AU    2008317493    4/2009
AU    2012200569    2/2012
(Continued)

OTHER PUBLICATIONS

Australian Application No. 2008317493—Office Action Response, 24 pgs.
(Continued)

*Primary Examiner* — Clifford B Madamba

(57) ABSTRACT

An automatic teller machine (ATM) can operate to send an electronic push request, in various instances, using only an email address to process the push request from a user. The ATM may be configured with customized display software, for example, that allows an end user to operate a touchscreen (or other input mechanism) to enter email addresses for one or more electronic transfer destinations. In various instances, the ATM may also communicate with a back-end server to perform queries on an entered email address and to map the email address to a pre-existing account or a holding account. Thus, a user can effectuate electronic transfers without needing to know, for example, a routing number associated with a destination for the transfer, representing an innovative improvement over previous electronic transfer technology.

20 Claims, 8 Drawing Sheets

Related U.S. Application Data

(60) Provisional application No. 60/981,402, filed on Oct. 19, 2007.

(51) Int. Cl.
    *G06Q 30/00*        (2012.01)
    *G06Q 30/06*        (2012.01)

(58) Field of Classification Search
    USPC .......................................................... 705/39
    See application file for complete search history.

(56) References Cited

U.S. PATENT DOCUMENTS

| | | |
|---|---|---|
| 5,329,589 A | 7/1994 | Fraser et al. |
| 5,677,955 A | 10/1997 | Doggett et al. |
| 5,742,668 A | 4/1998 | Pepe et al. |
| 5,778,178 A | 7/1998 | Arunachalum |
| 5,790,790 A | 8/1998 | Smith et al. |
| 5,893,080 A | 4/1999 | McGurl et al. |
| 5,903,874 A | 5/1999 | Leonard |
| 5,903,880 A | 5/1999 | Biffar |
| 5,915,023 A | 6/1999 | Bernstein |
| 5,937,396 A | 8/1999 | Konya |
| 5,963,647 A | 10/1999 | Downing et al. |
| 5,987,500 A | 11/1999 | Arunachalam |
| 6,029,151 A | 2/2000 | Nikander |
| 6,032,133 A | 2/2000 | Hilt et al. |
| 6,058,382 A | 5/2000 | Kasai |
| 6,069,896 A | 5/2000 | Borgstahl et al. |
| 6,070,150 A | 5/2000 | Remington et al. |
| 6,076,068 A | 6/2000 | DeLapa et al. |
| 6,192,407 B1 | 2/2001 | Smith et al. |
| 6,212,556 B1 | 4/2001 | Arunachalam |
| 6,223,168 B1 | 4/2001 | McGurl et al. |
| 6,260,024 B1 | 7/2001 | Shkedy |
| 6,324,526 B1 | 11/2001 | D'Agostino |
| 6,330,544 B1 | 12/2001 | Walker et al. |
| 6,338,050 B1 | 1/2002 | Conklin et al. |
| 6,553,346 B1 | 4/2003 | Walker et al. |
| 6,609,113 B1 | 8/2003 | O'Leary et al. |
| 6,694,300 B1 | 2/2004 | Walker |
| 2001/0037315 A1* | 11/2001 | Saliba .................. G06Q 10/107 705/70 |
| 2002/0032651 A1 | 3/2002 | Embrey |
| 2003/0217005 A1* | 11/2003 | Drummond ............ G06Q 30/06 705/43 |
| 2006/0195398 A1 | 8/2006 | Dheer et al. |
| 2009/0089211 A1 | 4/2009 | Morse |
| 2009/0106118 A1 | 4/2009 | Pelegero et al. |
| 2009/0106188 A1 | 4/2009 | Jun |
| 2009/0132423 A1 | 5/2009 | Liu |

FOREIGN PATENT DOCUMENTS

| | | |
|---|---|---|
| AU | 2013263742 | 12/2013 |
| AU | 2016200665 | 2/2016 |
| CA | 2332656 | 7/2002 |
| CA | 2702403 | 4/2009 |
| EP | 2201514 | 2/2015 |
| GB | 2328310 | 2/1998 |
| KR | 20000050092 | 8/2000 |
| KR | 20010008292 | 2/2001 |
| WO | WO 01/063520 | 8/2001 |
| WO | WO 07/053123 | 11/2006 |
| WO | 09054871 | 4/2009 |
| WO | WO/2009/054871 | 4/2009 |

OTHER PUBLICATIONS

Australian Application Serial No. 2008317493, Examiner Report Response filed Sep. 20, 2011, 12 pgs.
Australian Application Serial No. 2008317493, Notice of Acceptance dated Oct. 19, 2011, 4 pgs.
Australian Application Serial No. 2008317493, Subsequent Examiner Report dated May 24, 2011, 2 pgs.
Australian Application Serial No. 2012200569, Examination Report dated Apr. 2, 2013, 3 pgs.
Australian Application Serial No. 2012200569, Response filed Aug. 13, 2013 to Examiner's Report dated Apr. 2, 2013, 13 pgs.
Australian Application Serial No. 2013263742, Office Action dated Feb. 4, 2015, 2 pgs.
Australian Application Serial No. 2013263742, Response filed Jan. 20, 2016 to Subsequent Examiners Report dated Sep. 24, 2015, 31 pgs.
Australian Application Serial No. 2013263742, Response filed Sep. 1, 2015, 4 pgs.
Australian Application Serial No. 2013263742, Subsequent Examiners Report dated Jan. 28, 2016, 5 pgs.
Australian Application Serial No. 2013263742, Subsequent Examiners Report dated Sep. 24, 2015, 5 pgs.
Australian Application Serial No. 2008317493, Examiner Report dated Nov. 22, 2010, 2 Pgs.
Canadian Application Serial No. 2,702,403, Offfice Action dated Jun. 6, 2012, 6 pgs.
Canadian Application Serial No. 2,702,403, Office Action dated Feb. 17, 2015, 5 pgs.
Canadian Application Serial No. 2,702,403, Office Action dated Dec. 18, 2013, 4 pgs.
Canadian Application Serial No. 2,702,403, Response filed Jun. 11, 2014 to Office Action dated Dec. 18, 2013, 10 pgs.
Canadian Application Serial No. 2,702,403, Response filed Dec. 3, 2012 to Offfice Action dated Jun. 6, 2012, 25 pgs.
Card HQ, Online Resources, Online Resources Corporation, [Online]. Retrieved from the Internet: <URL: http://www.orcc.com/products/ebanking/banking/cardhq.asp>, (2008), 2 pgs.
European Application Serial No. 08794864.2, Examination Notification Art. 94(3) dated Aug. 9, 2012, 4 pgs.
European Application Serial No. 08794864.2, Extended European Search Report dated Dec. 2, 2010, 5 pgs.
European Application Serial No. 08794864.2, Office Action dated Sep. 19, 2014, 4 pgs.
European Application Serial No. 08794864.2, Response filed Jun. 14, 2011 to Extended European Search Report dated Dec. 2, 2010, 15 pgs.
European Application Serial No. 08794864.2, Response filed Dec. 3, 2012 to Examination Notification Art. 94(3) dated Aug. 9, 2012, 13 pgs.
European Application Serial No. 08794864.2, Summons to Attend Oral Proceedings dated Mar. 27, 2014, 5 pgs.
International Application Serial No. PCT/US2008/009188, International Preliminary Report on Patentability dated Apr. 29, 2010, 5 pgs.
International Application Serial No. PCT/US2008/009188, International Search Report dated Feb. 24, 2009, 4 pgs.
International Application Serial No. PCT/US2008/009188, Written Opinion dated Feb. 24, 2009, 6 pgs.
Security Assertion Markup Language, From Wikipedia, the free encyclopedia, [Online]. Retrieved from the Internet: <URL: http://en.wikipedia.org/wiki/Saml>, (Sep. 26, 2008), 8 pgs.
Why NYCE Plans to Test Two Online PIN Debit Systems in Parallel, Digital Transactions, [Online]. Retrieved from the Internet: <URL: http://www.digitaltransactions.net/newsstory.cfm?newsid=1995>, (Dec. 3, 2008), 3 pgs.
Entire Prosecution History of U.S. Appl. No. 60/981,402, titled Payment Using Funds Pushing, filed Oct. 19, 2007.
Entire Prosecution History of U.S. Appl. No. 11/962,733, titled Payment Using Funds Pushing, filed Dec. 21, 2007.

\* cited by examiner

AUTOMATIC TELLER MACHINE (ATM) ELECTRONIC PUSH REQUESTS

PRIORITY CLAIMS

This application is a continuation of U.S. patent application Ser. No. 11/962,733, filed on Dec. 21, 2007, the benefit of U.S. Provisional Patent Application Ser. No. 60/981,402, filed on Oct. 19, 2007, and titled "Payment Using Funds Pushing." The contents of which are incorporated herein by reference in their entirety.

BACKGROUND

The Internet and the World Wide Web ("Web") have changed the landscape of information delivery and affected numerous aspects of life, including electronic commerce and entertainment. One area that has benefited from this technological development is the ability for individuals to buy and sell products over the Internet. The resulting growth of electronic commerce has encouraged many businesses to join hands in doing business and in sharing customers and their information. The overlapping businesses, partnerships in conducting business, referrals, mutual distribution of resources, and sharing of users and user information has created a network of applications, servers, and Websites which has created various technical challenges, complexities, and insecurities.

BRIEF DESCRIPTION OF THE DRAWINGS

Some embodiments are illustrated by way of example and not limitation in the figures of the accompanying drawings in which.

DETAILED DESCRIPTION

Figure 1:
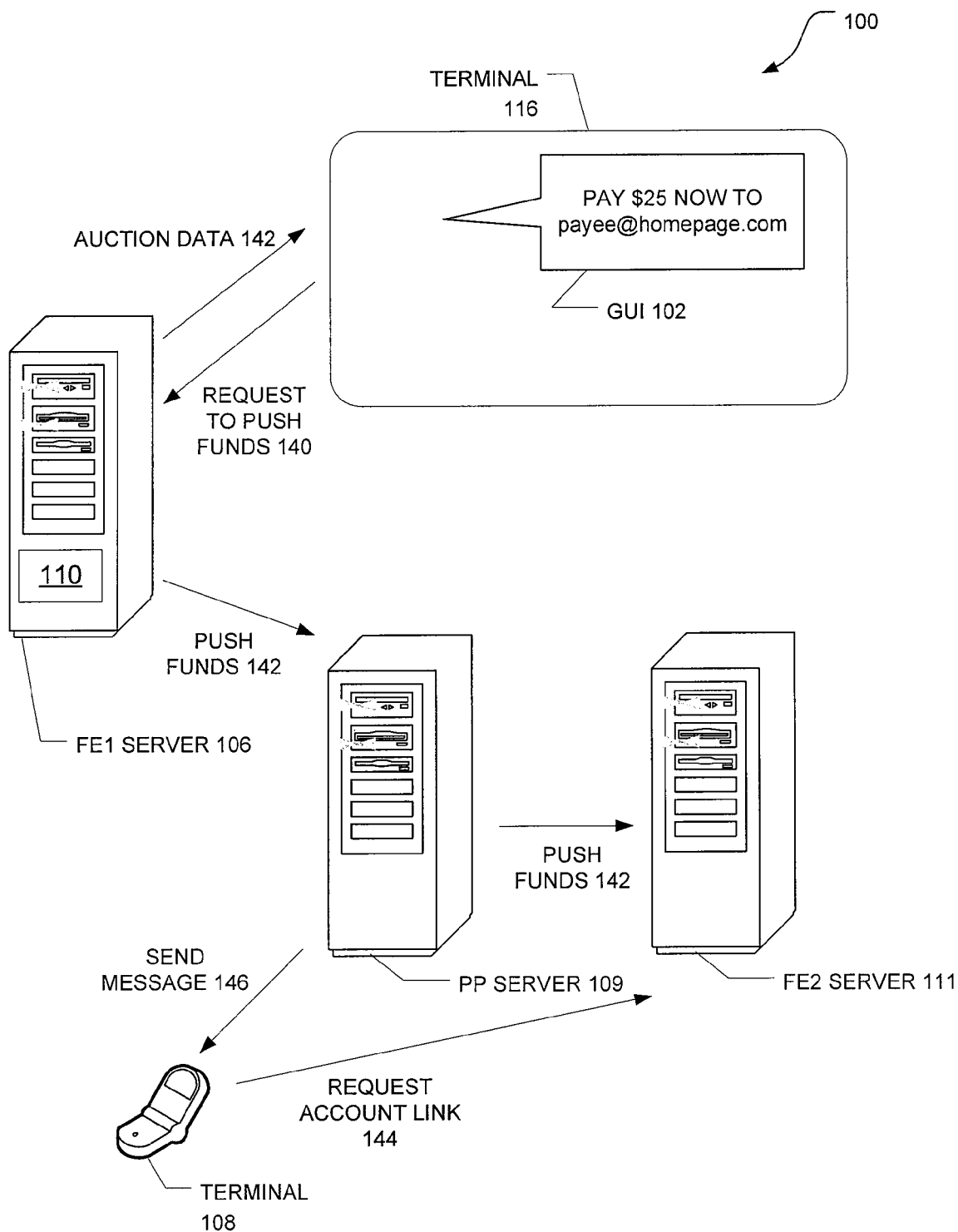
FIG. 1 is a high level diagram illustrating payment using funds pushing according to various embodiments of the invention.

The inventors have discovered that there is a demand from consumers for substantially-instantaneous settlement when funds are moved between various entities. For example, conventional mechanisms include the use of the Automated Clearing House (ACH) to transfer funds from a bank to a vendor. Faster methods, such as credit card payment, often result in relatively steep fees for service.

To address these challenges, among others, the inventors have discovered a mechanism for pushing funds directly from a financial entity, such as a bank, to a payment processor (e.g., PayPal, Inc. a subsidiary of eBay Inc. of San Jose, Calif.), based on an email address. If the owner of the email address has another financial entity account linked to the email address, then the funds can be immediately swept by the payment processor into the linked account.

For the purposes of this document, the term "agent" shall be taken to include, but not be limited to, a person or a machine (e.g. Automated Teller Machine (ATM)) that is capable of taking some kind of identification (e.g., driver license, passport, other valid identification cards, or biometric identification) to verify the identity of a customer.

For the purposes of this document, the term "email account" shall be taken to include, but not be limited to, an account associated with an email address. An email account may be distinguished from a normal account in several ways, including the manner in which the account may be accessed.

For the purposes of this document, the term "normal account" shall be taken to include, but not be limited to, any account other than a mobile account.

Some embodiments described herein enable a user to remit an amount from his/her financial entity account to one or more mobile phone numbers associated with one or more second parties (e.g., persons who may or may not have any bank accounts). The second party may be notified of the amount and the identification of the remitting party. The second party may spend any part of the received amount by transferring that portion to another account (e.g., a second party's account or a third party's account in the same financial entity or at other financial institutions or banks), receiving cash at an agent, or shopping at a vendor's business.

Some embodiments may include receiving a request, at a financial entity and from a first party, to remit an amount (e.g. $100) from an account associated with the first party, to an account linked to an email address associated with a second party; and notifying (e.g., by calling or by sending a message such as a text message) the second party of the amount to be remitted and the identity (e.g., name and phone number or email address) of the first party.

In some embodiments, the financial entity, having an established banking relationship with the payment processor, can push funds directly into an account held either within the financial entity by the payment processor, or by the payment processor itself. The request by the first party may be made to the financial entity using a wired or wireless terminal, including a cellular telephone, or by online via the Internet.

Example System Architecture

FIG. 1 is a high level diagram illustrating payment using funds pushing according to various embodiments of the invention. Here it can be seen that a system 100 for pushing funds may operate to receive a request 140 to push funds at a first financial entity, perhaps at a first financial entity server 106. The request 140 may be initiated by a first party (e.g., a person having ownership of an account held by the first financial entity), making use of a client terminal 116 with a graphical user interface (GUI) 102. One example of such a request might embody the terms "$25" (an amount) and "payee@homepage.com" (an email address associated with a second party).

Responsive to receiving the request, the first financial entity may then push the amount to be paid (here "$25") from the account associated with the first party directly to a selected payment processor as part of activity 142. If the email address of the second party is linked to an account at a second financial entity, the payment processor, perhaps taking the form of a payment processor server 109, may act to push the funds to the account at the second financial entity, which may take the form of a second financial entity server 111.

A message 146 may be sent to another client terminal 108, which may take the form of a cellular telephone in some embodiments, informing the second party of: the fact that a request has been made, the identity of the first party initiating the request, the identity of the first financial entity pushing the funds, the amount of funds requested to be transferred, that the funds have been successfully pushed to the payment processor, and/or that the funds have been successfully pushed to the second financial entity.

The message 146 may also be used to inform the second party that there is no account at a second financial entity linked to the email address, and that such a link can be made. The second party may go on to establish such a link, and later request that the funds be swept from a holding account at the payment processor to the linked account.

In some embodiments, one or more banks selected by the payment processor may be offered to the second party as part of a list in the message 146, so that when a bank is selected from the list, as part of a link request 144, an account is created substantially simultaneously at the selected bank, and the funds are then pushed into the newly-created account. The first party account may comprise a bank account, a credit/debit account, a brokerage account, and other types of accounts.

In some embodiments, the first party may visit a website associated with the first financial entity to login and complete a request form to initiate payment. After receiving the request, the first financial entity may push the requested funds to the payment processor, and then the funds may be pushed from the payment processor directly to a second financial entity having an account linked to the email address.

Figure 2:
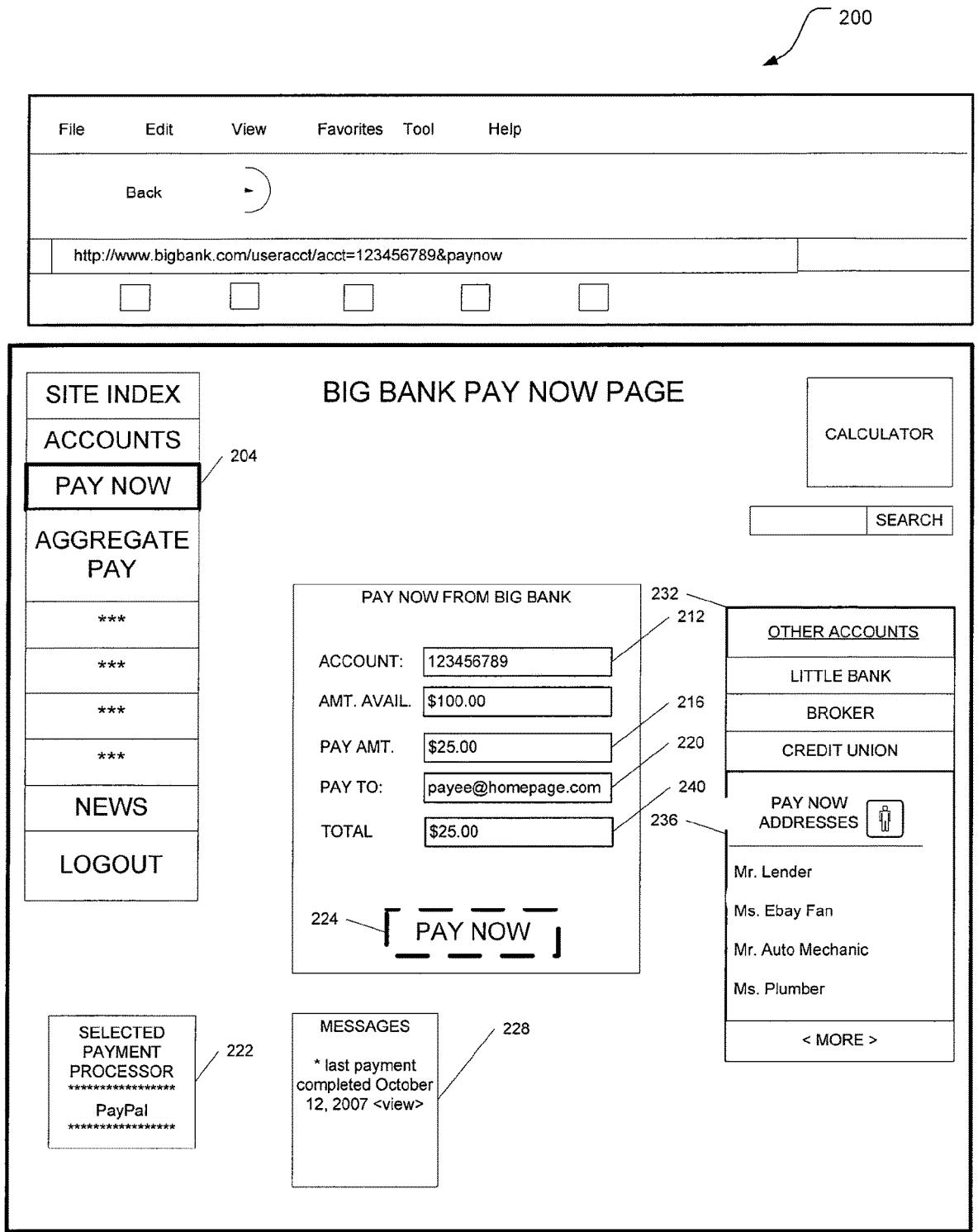
FIG. 2 is a simplified diagram illustrating an example graphical user interface according to various embodiments of the invention.

FIG. 2 is a simplified diagram illustrating an example graphical user interface 200 according to various embodiments of the invention This interface 200 is one of many that are possible. In the particular example of FIG. 2, a sample web page that might be seen by an account owner that has logged into his bank account on the Internet is shown. Here, the "PAY NOW" option 204 has been selected, calling up the PAY NOW PAGE 208. This selection permits the account owner (e.g., a first party) to select a particular account 212 that can be used to send a payment amount 216 to another account that is linked to a specified email address 220. To push the funds from the account to a payment processor 222 that can make the fund transfer, and eventually, to the party that is to receive payment (e.g., a second party associated with the email address 220), the account owner might simply click on the PAY NOW widget 224.

In some embodiments, a message field 228 in the GUI 200 may be used to inform the account owner that the transfer of funds has been completed. Other fields in the GUI 200 may be used to provide alternatives, such as an OTHER ACCOUNTS field 232, to select a particular account to use for payment, and a PAY NOW ADDRESSES field 236 to select email addresses, such as from an address book, to be paid. While not shown in FIG. 2, those of ordinary skill in the art will realize that multiple email addresses may be specified so that the payment amount 216 can be sent to multiple addressees at the same time. In this case, a total amount field 240 may be used to reflect the total amount of funds to be paid/pushed.

Figure 3:
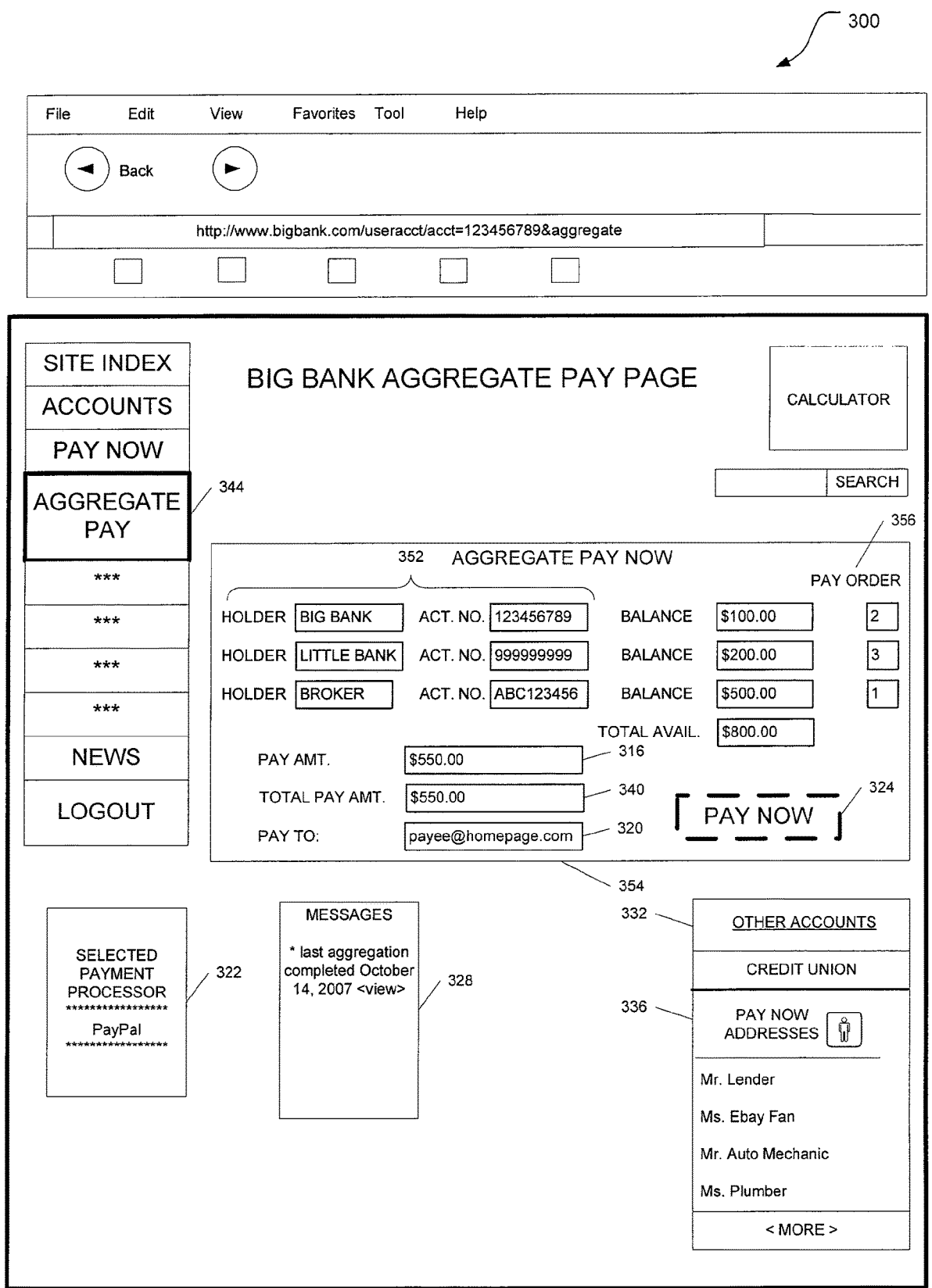
FIG. 3 is a block diagram illustrating another example of a graphical user interface according to various embodiments of the invention.

FIG. 3 is a block diagram illustrating another example of a graphical user interface 300 according to various embodiments of the invention. This interface 300 is one of many that are possible. In the particular example of FIG. 3, a sample web page that might be seen by an account owner that has logged into his bank account on the Internet is shown. Here, the "AGGREGATE PAY" option 344 has been selected, calling up the BIG BANK AGGREGATE PAY PAGE 348. This selection permits the account owner (e.g., a first party) to select several accounts 352 (e.g., accounts shown to be held by BIG BANK, LITTLE BANK, and BROKER) in the aggregate pay now window 354 that can be used to send a payment amount 316 to another account that is linked to a specified email address 320. To push the funds from the selected accounts 352 to a payment processor 322 that can make the fund transfer, and eventually, to the party that is to receive payment (e.g., a second party associated with the email address 320), the account owner might simply click on the PAY NOW widget 324.

When using the aggregate pay function, multiple accounts 352 from a variety of financial entities can be used to make a payment. The order of funds withdrawal can be specified with the pay order indicator windows 356, so that when the total payment amount 340 is greater than the balance of funds in the first account indicated in the pay order indicator windows 356 (e.g., the first account held by BROKER has $500.00 on hand, while the total payment amount is $550.00), additional funds may be aggregated from other accounts (e.g., the second in order, which is the BIG BANK account that has $100.00), and the necessary funds to make up the needed payment can be provided. The accounts 352 used for aggregation can be added and removed as desired, and other accounts may be selected (e.g., the CREDIT UNION account shown in the OTHER ACCOUNTS field 332 window 360).

In some embodiments, a message field 328 in the GUI 300 may be used to inform the account owner that the transfer of funds has been completed. Other fields in the GUI 300 may be used to provide alternatives, such as an OTHER ACCOUNTS field 332, to add or remove a particular account to use for payment, and a PAY NOW ADDRESSES field 336 to select email addresses, such as from an address book, to be paid. While not shown in FIG. 3, those of ordinary skill in the art will realize that multiple email addresses may be specified so that the payment amount 316 can be sent to multiple addressees at the same time. The total amount field 340 can be used to reflect the total amount of funds to be paid/pushed.

Figure 4:
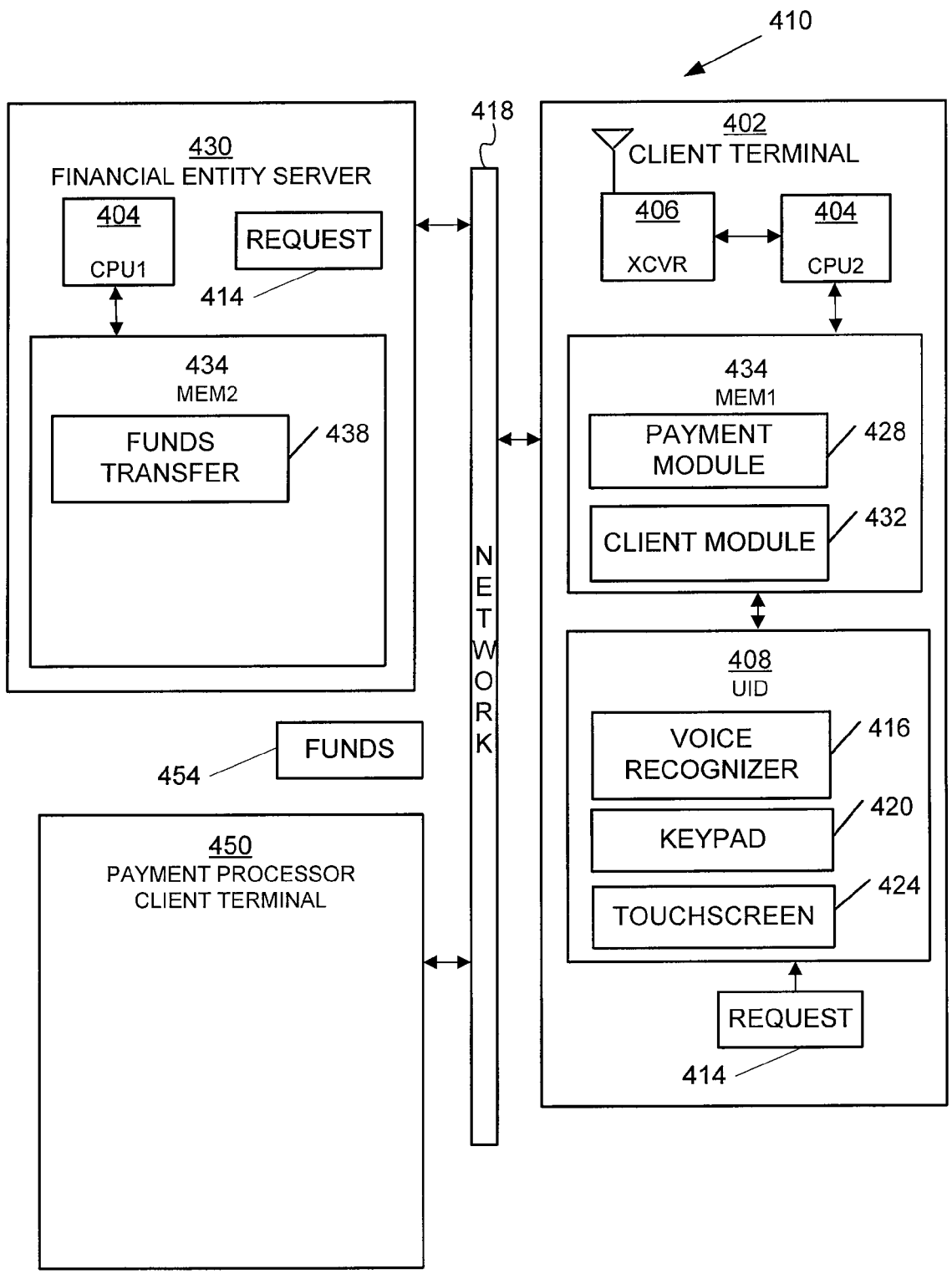
FIG. 4 is a block diagram of apparatus and systems according to various embodiments of the invention.

FIG. 4 is a block diagram of apparatus 402 and systems 410 according to various embodiments of the invention. The apparatus 402 can take many forms, such as an automated teller machine (ATM), a cellular telephone, a desktop computer terminal with Internet access, etc.

In some embodiments, the apparatus 402 may comprise one or more user input devices 408, such as a voice recognition processor 416, a keypad 420, a touchscreen 424, a thumbwheel, a button, etc. The apparatus 402 may include a client module 432 to communicatively couple to a server (e.g., server 430). The apparatus 402 may include a payment module 428 to receive a request 414 initiated by the user input device 408 to push an amount to be paid from an account associated with a first party and held by the first financial entity directly to an account linked to an email address associated with a second party via a selected payment processor. The apparatus 402 may further comprise a cellular telephone transceiver 406 to transmit a message associated with the request 414, wherein the message is to be sent to the email address. Thus, an account owner at the first financial entity might use his cell phone to push funds directly from his bank to the payment processor, and send a message at the time the funds are moved to the payment processor.

Other embodiments may be realized. For example, a system 410 may comprise one or more of the apparatus 402. Thus, a system 410 may comprise a first client terminal 402 having a user input device 408, a client module 432, and a payment module 428 to receive a request 414 initiated by the user input device 408.

The system 410 may further include a server 430 having a funds transfer module 438 associated with an account associated with a first party and held by a first financial entity. The request 414 may be to push an amount to be paid from the account associated with the first party directly to an account linked to an email address associated with a second party via a selected payment processor. The funds transfer module 438 may be used to effect the direct transfer of the amount to be paid to the selected payment processor responsive to receiving the request 414. Thus, a client terminal 402 and a bank server 430 may cooperate to push funds, in contrast with the conventional process of "pulling" funds from the bank account into a payment processor by making a request from a payment processor (e.g., PayPal payment processing service request) to a bank in order to move the funds from the bank to the payment processor.

In some embodiments, the system 410 comprises a second client terminal 450 associated with the selected payment processor and communicatively coupled to the server 430, perhaps via a wired or wireless network 418, including a global computer network, such as the Internet. An ATM may be used to house the user input device 408 in some instances.

Example Methods

Figure 5:
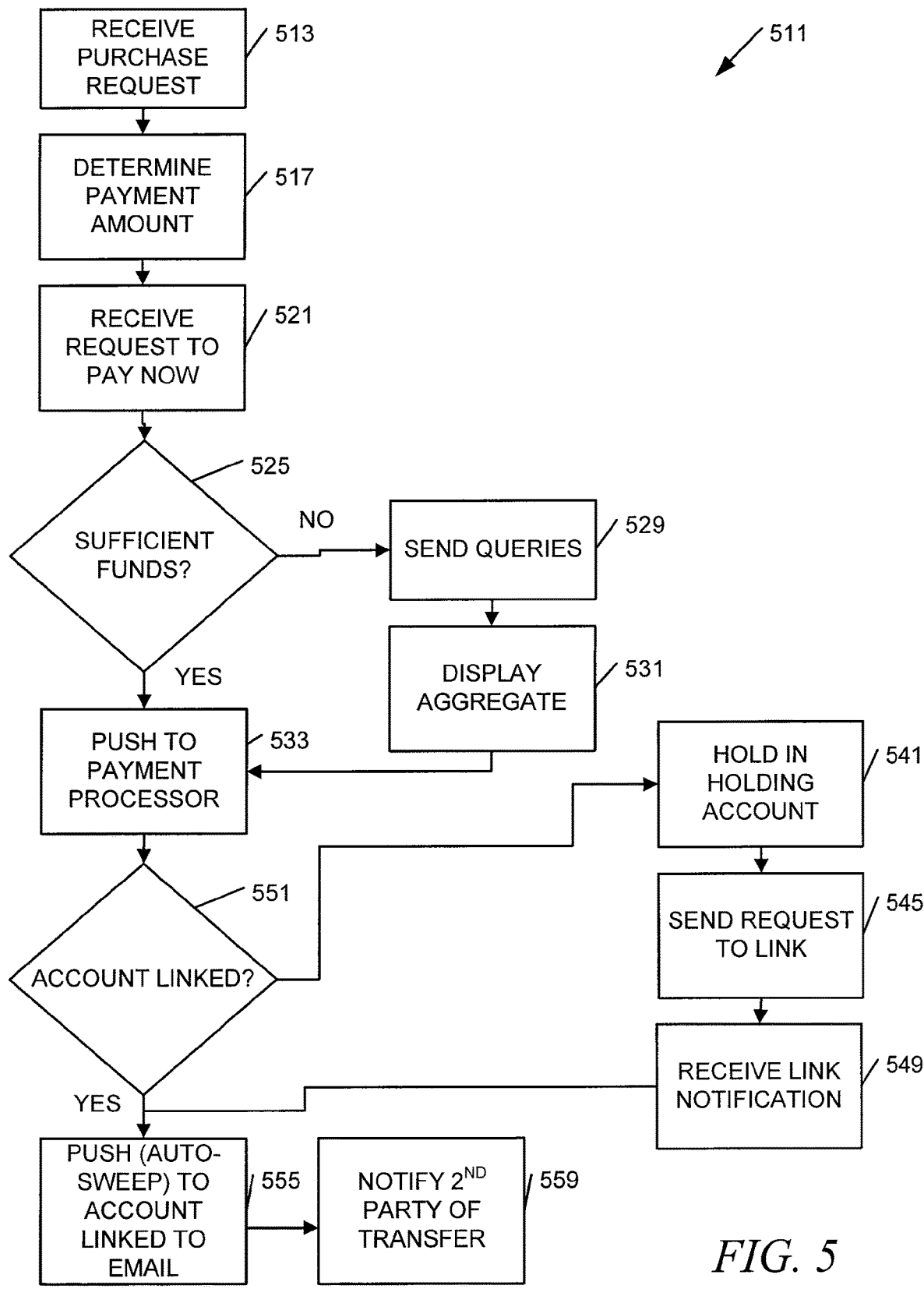
FIG. 5 is a flow diagram illustrating methods according to various embodiments of the invention.

FIG. 5 is a flow diagram illustrating methods 511 according to various embodiments of the invention. For example, a computer-implemented method 511 may begin with receiving a request to purchase an item presented by an online marketplace at block 513, and continue on to block 517 with determining the amount to be paid from a purchase price associated with the item. Thus, an online purchase might serve to initiate the funds-push process. In many cases, manual activity by a bank customer may serve to provide a request for payment, and in some instances, a request can also be made to set up periodic payments, e.g. $600 each month for rent to the landlord's email address, and so forth. Many variations are possible.

In most embodiments the method 511 includes, at block 521, receiving a request at a first financial entity from a first party to transfer an amount to be paid from an account associated with the first party and held by the first financial entity, to an account linked to an email address associated with a second party via a selected payment processor. In some cases, the request at block 521 may be made when there are insufficient funds in the first party account.

Thus, the method 511 may include determining the sufficiency of funds in the account associated with the first party to pay the amount to be paid at block 525. If it is determined that the funds are insufficient to pay the amount to be paid at block 525, then the method 511 may include aggregating a total amount of available funds from other financial entities until the total amount is sufficient to pay the amount to be paid.

To accomplish the aggregation of funds, several methods may be employed. The first may be to manually aggregate funds, as shown in FIG. 3, where the account owner selects financial entities to supply the funds, and perhaps, the order in which funds are to be applied.

A second method might include auto-aggregation to make up for the shortfall. In this case, the method 511 may include sending queries to aggregate information including a plurality of available transfer amounts associated with a corresponding plurality of financial entities (including the first financial entity) at block 529, and then displaying the plurality of available transfer amounts as part of a single display page prior to pushing the amount to be paid at block 531. Thus, inquiries can be made to gather information on money available to pay out from other accounts, and the available funds from several financial institutions can be displayed at once.

When available funds are sufficient to pay the amount requested, then the method 511 may include pushing the amount to be paid from the account associated with the first party directly to the selected payment processor at block 533.

The first party and first financial entity are thus the parties that pay, and the second party is the party that is paid. Essentially, using a payment processor, one can transfer money from an account at a first financial entity to an account at a second financial entity by using no more than an email address associated with the second financial entity account as the sole identifier. As a matter of contrast, the ACH network does not identify account holders by their email address, even though it may act as a processor to transfer funds between individuals holding accounts in different entities.

A financial entity can server as a funding source for a transaction when funds are transferred. A payment processor transfers money between two accounts, but is not a source of funds. For example, the PayPal payment processing service operates to transfer money between two accounts it holds, and in the process, requests funds to be pulled from a bank account associated with the first account. In various embodiments, a bank, as a financial entity, serves as the ultimate source of funds, and can push them to a payment processor directly, without receiving a request from the payment processor to pull them.

In some embodiments, the method 511 includes determining whether an account is linked to the email address at block 551. If a link does not exist (e.g., there is no bank account linked to the email address), the method 511 may include creating, by the selected payment processor, an account linked to the email address as a holding account responsive to receiving the amount to be paid, and then holding the amount to be paid in the holding account at block 541. The method 511 may then continue on to block 545 with sending a request, to the second party, to link an account held by a second financial entity (e.g., another bank) to the email address. That is, the method 511 may include sending a message to the email address requesting the second party to establish an account associated with a second financial entity to link to the email address. Thus, if there is no bank account linked to the email address, a request can be made to get one. Once the link is made, the method 511 may include receiving a notification that the account associated with the second financial entity has been established at block 549.

If the determination is made at block 551 that an account is linked to the specified email address, then the method 511 may include pushing the amount to be paid from the selected payment processor directly to the account linked to the email address at block 555. In some cases, the method 511 may include, responsive to receiving the notification at block 549, automatically sweeping the amount to be paid from the selected payment processor directly to the account associated with the second financial entity. The auto-sweep operation may even operate to sweep funds into a credit card account. The method 511 may conclude at block 559 with notifying the second party of the amount to be paid by sending an email message to the email address.

Figure 6:
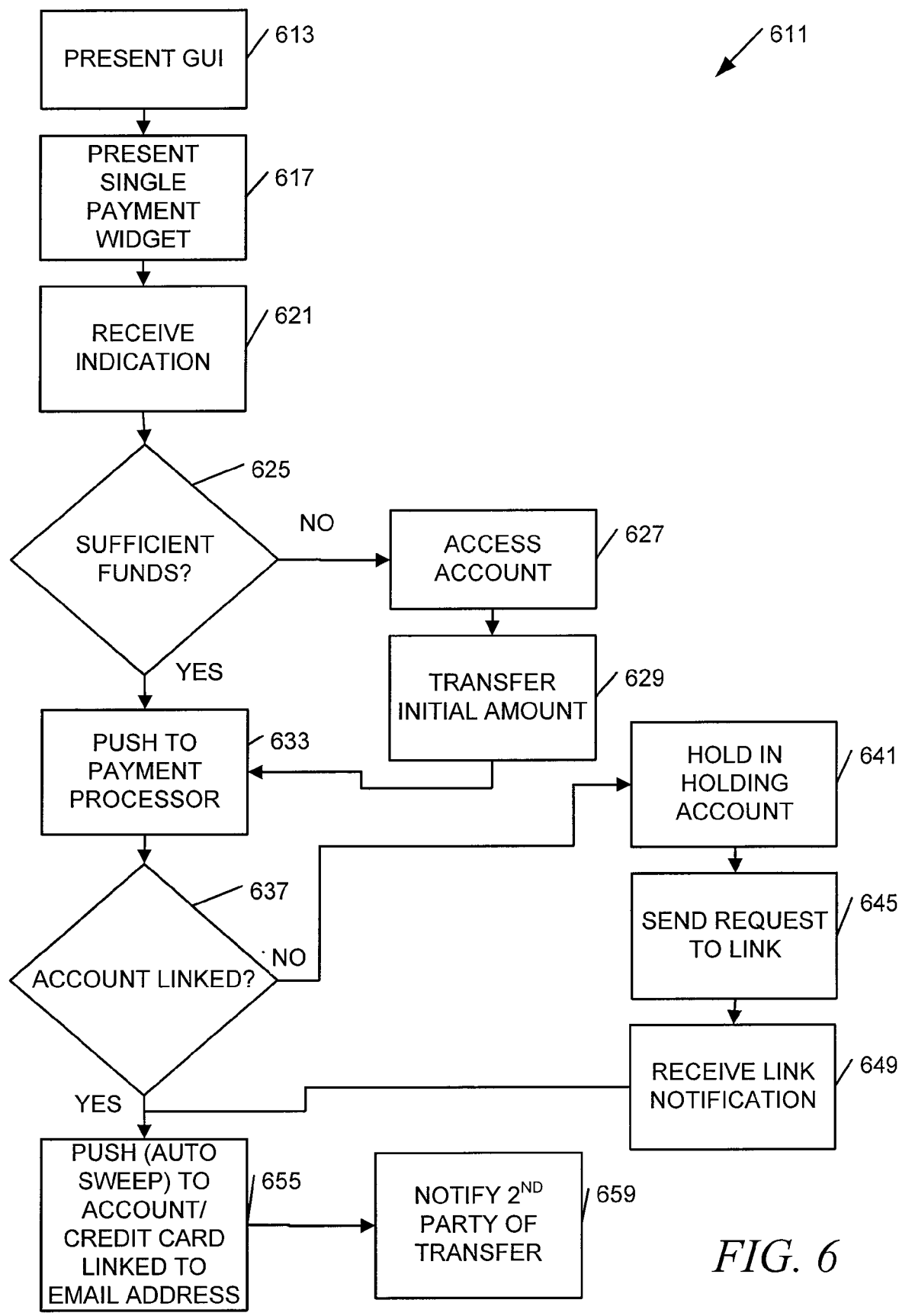
FIG. 6 is a flow diagram illustrating additional methods according to various embodiments of the invention.

FIG. 6 is a flow diagram illustrating additional methods 611 according to various embodiments of the invention. In some embodiments, a computer-implemented method 611 may begin at block 613 with presenting, via a networked client coupled to a first financial entity, a graphical user interface (GUI) including an account associated with a first party, an amount to be paid, and an email address associated with a second party. The method 611 may continue on to block 617 with presenting a single payment widget as part of the GUI (e.g., a "pay now" button).

In most embodiments, the method 611 may include, at block 621, receiving an indication from the GUI to transfer, via a selected payment processor, the amount to be paid from the account associated with the first party and held by the first financial entity to an account linked to the email address. A few examples of many possible GUIs are shown in FIGS. 2 and 3.

If a shortfall of funds exists in the primary payment account, as determined at block 625, the method 611 may include accessing an account held by another financial entity responsive to receiving the (transfer) indication at block 627, and transferring an initial amount less than the amount to be paid from the account held by the other financial entity to the account held by the first financial entity at block 629. This initial amount will most likely be an amount sufficient to make up the shortfall in the primary account, but can also be a greater amount, or a lesser amount (if further accounts are to be accessed and other transfers are made, until the aggregate amount is sufficient to pay the total amount requested).

As noted previously, when a request from the payment processor to the first financial entity had been made prior to the funds being transferred to the payment processor, then the funds would have been "pulled" into the financial processor. However, as a matter of contrast, in most embodiments, the method 611 includes pushing the amount to be paid from the account held by the first financial entity (e.g., comprising a bank) directly to the selected payment processor at block 633. That is, the funds are "pushed" to the payment processor directly from the first financial entity, without a request to pull funds being initiated by the payment processor.

As noted previously, if there is no link established between the specified email address and an account, as determined at block 637, the method 611 may include holding the funds pushed to the payment processor in a holding account at block 645, sending a request to the second party to create a link between the email address and an account at a second financial entity (e.g., comprising a bank, brokerage, credit union, or credit card account) at block 645, and then receiving notification that the link has been created at block 649.

Once it is determined that an account is linked to the specified email address, the method 611 may include pushing the amount to be paid from the selected payment processor directly to a credit card account linked to the email address at block 655. In some cases, the method 611 may also include automatically sweeping the amount to be paid from the selected payment processor to the account linked to the email address at block 655. The method 611 may conclude with notifying the second party of the amount to be paid by sending a message to the email address and/or sending the message to a mobile phone number associated with the email address. The message may be used to notify the second party (e.g., payee) that he has been paid, or that he will be paid if he creates an account link, for example.

In some embodiments, an email registry can be used as an adjunct to payment processors for each of the methods 511, 611 described herein. The registry, which links email addresses to bank accounts or credit card accounts, can serve as a lookup service to be used by payment processors. The registry may also include links between phone numbers, including cell phone numbers, bank accounts, credit card accounts, and email addresses.

The methods 511, 611 described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Thus, other embodiments may be realized, including a machine-readable medium (e.g., the memories 434 of FIG. 4) encoded with instructions for directing a machine to perform operations comprising any of the methods described herein. For example, some embodiments may include a machine-readable medium encoded with instructions for directing a client terminal or server to perform a variety of operations. Such operations may include any of the activities presented in conjunction with the methods 511, 611 described above.

Example Network Architecture

Figure 7:
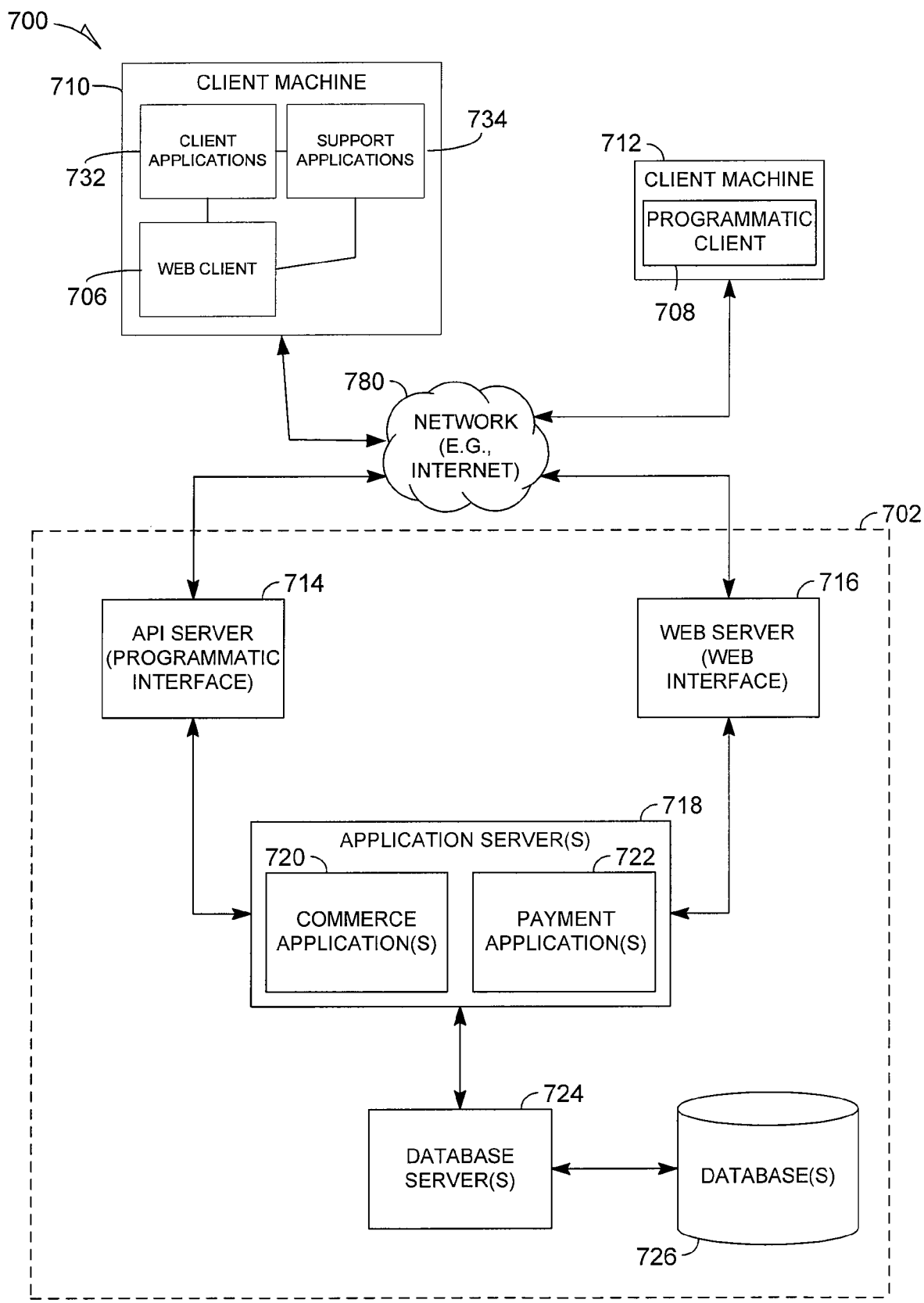
FIG. 7 is a block diagram illustrating a client-server architecture to facilitate payment using funds pushing according to various embodiments of the invention.

FIG. 7 is a block diagram illustrating a client-server architecture to facilitate payment using funds pushing according to various embodiments of the invention. The system 700, having a client-server architecture used for mobile remittance and/or payments. A financial platform, in the example form of a network-based financial system 702, provides server-side functionality, via a network 780 (e.g., the Internet) to one or more clients. FIG. 7 illustrates, for example, a web client 706 (e.g., a browser, such as the Internet Explorer browser developed by Microsoft Corporation of Redmond, Wash.), and a programmatic client 708 executing on respective client machines 710 and 712. In an example embodiment, either or both of the web client 706 and programmatic client 708 may include a mobile device.

Turning specifically to the network-based financial system 702, an Application Program Interface (API) server 714 and a web server 716 are coupled to, and provide programmatic and web interfaces respectively to, one or more application servers 718. The application servers 718 host one or more financial applications 720 and payment applications 722 (e.g., similar to or identical to the funds transfer module 438 of FIG. 4). The application servers 718 are, in turn, shown to be coupled to one or more database servers 724 that facilitate access to one or more databases 726, such as registries that include links between email addresses, phone numbers, and/or financial entity accounts.

The financial applications 720 provide a number of financial functions and services to users that access the network-based financial system 702. The payment applications 722 facilitate payments to accounts associated with email addresses.

Further, while the system 700 shown in FIG. 7 employs a client-server architecture, the present application is of course not limited to such an architecture, and could equally well find application in a distributed, or peer-to-peer, architecture system. The various financial and payment applications 720 and 722 may also be implemented as standalone software programs, which do not necessarily have networking capabilities.

The web client 706, it will be appreciated, may access the various financial and payment applications 720 and 722 via the web interface supported by the web server 716. Similarly, the programmatic client 708 accesses the various services and functions provided by the financial and payment applications 720 and 722 via the programmatic interface provided by the API server 714. The programmatic client 708 may, for example, be a payment module (e.g., similar to or identical to the payment module 428 of FIG. 4) to enable a user to request transfer of money from one or more of his/her accounts to one or more email addresses and to perform batch-mode communications between the programmatic client 708 and the network-based financial system 702. Client applications 732 and support applications 734 may perform similar or identical functions.

Thus, the network-based financial system 702 may provide a number of payment mechanisms whereby a user may request a payment from one or more of his/her accounts to a one or more email addresses. The financial applications 720 may include one or more account management applications which support and provide services related to various user accounts in a financial entity (e.g. a bank). The various account management applications may also provide a number of features such as supervising account transfers, holding account balances, and keeping tracking of and reporting transactions to relevant applications.

The financial applications 720 may also include dispute resolution applications to provide mechanisms whereby disputes arising between transacting parties may be resolved. For example, the dispute resolution applications may provide guided procedures whereby the parties are guided through a number of steps in an attempt to settle a dispute. In the event that the dispute cannot be settled via the guided procedures, the dispute may be escalated to a customer service agent for the financial system 702, third party mediator, or arbitrator.

Example Machine Architecture

Figure 8:
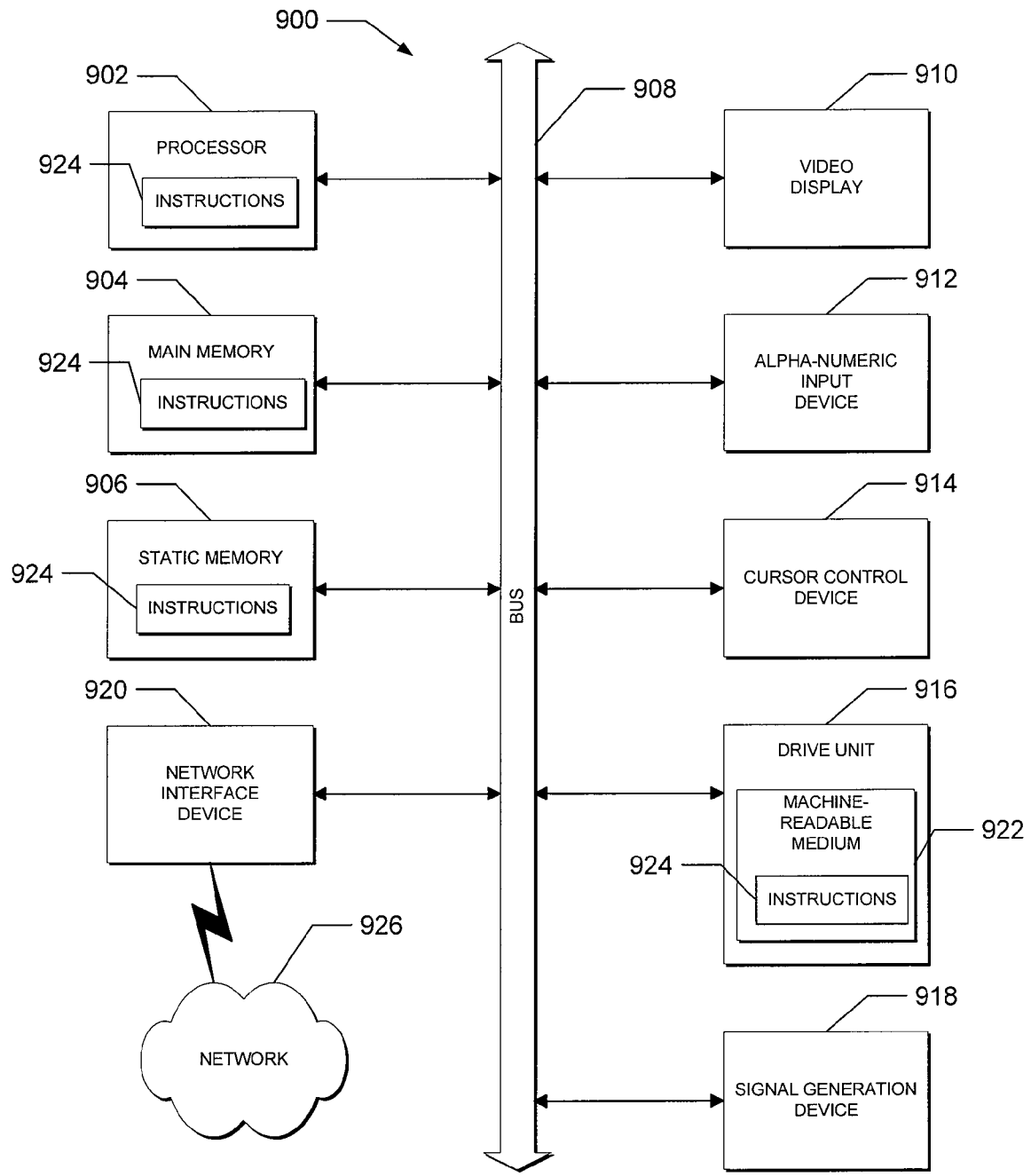
FIG. 8 is a block diagram of a machine in the example form of a computer system according to various embodiments of the invention.

FIG. 8 is a block diagram, illustrating a diagrammatic representation of machine 900 in the example form of a computer system within which a set of instructions for causing the machine to perform any one or more of the methodologies discussed herein may be executed. The machine 900 may also be similar to or identical to the client terminal 402, server 430, or terminal 450 of FIG. 4.

In alternative embodiments, the machine 900 may operate as a standalone device or may be connected (e.g., networked) to other machines. In a networked deployment, the machine 900 may operate in the capacity of a server or a client machine in a server-client network environment, or as a peer machine in a peer-to-peer (or distributed) network environment.

The machine 900 may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, all of which communicate with each other via a bus 908. The computer system 900 may further include a video display unit 910 (e.g., liquid crystal displays (LCD) or cathode ray tube (CRT)). The computer system 900 also may include an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 may include a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media. The software 924 may further be transmitted or received over a network 926 via the network interface device 920, which may comprise a wired and/or wireless interface device.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include tangible media that include, but are not limited to, solid-state memories and optical and magnetic media.

Using the apparatus, systems, and methods disclosed herein may provide a novel mechanism for making payments using funds pushing. Thus, instead of initiating a request to transfer funds from a payment processor to a financial entity to "pull" the funds into the payment processor, the request may be initiated elsewhere, so that the funds can be "pushed" directly from the financial entity to the payment processor. More immediate transfer of funds, and increased user satisfaction, may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
   an automatic teller machine (ATM) apparatus, comprising:
      a display screen;
      a physical currency receiving device configured to accept physical banknotes;
      a user input device;
      a first processor; and
      a first non-transitory computer-readable storage medium having instructions stored thereon that are executable to cause the apparatus to perform first operations comprising:
         receiving a deposit of physical currency;
         via the user input device, receiving an electronic funds transfer request specifying only an email address as an identifier for transfer of a specific amount of currency, the specific amount of currency comprising at least a portion of the deposit of physical currency, wherein the electronic funds transfer request does not identify a particular financial entity to receive the specific amount of currency; and
   a networked server, configured to communicate with the ATM apparatus, comprising:
      a second processor; and
      a second non-transitory computer-readable storage medium having instructions stored thereon that are executable to cause the networked server to perform second operations comprising:
         determining, via database query, that no existing receiving account corresponds to the email address;
         responsive to the determining, creating a holding account linked to the email address;
         transmitting, from the networked server to an email server, an email message to the email address that includes one or more financial entities as linking options for the holding account;
         receiving, at the networked server, an indication of a linking selection of a particular entity of the one or more financial entities;
         based on the linking selection, transmitting, to a computer system associated with the particular entity, an account creation request for the particular entity;
         receiving an indication that a new currency-bearing account has been created responsive to the account creation request, wherein the new currency-bearing account is identified by a unique identifier within the ACH network; and
         responsive to the indication, automatically transferring funds from the holding account to the new currency-bearing account over the ACH network using the unique identifier and not the email address.

2. The system of claim 1, wherein the first operations further comprise crediting the deposit of physical currency to an existing deposit account of a user of the ATM.

3. The system of claim 1, wherein the first operations further comprise:
   receiving a physical card instrument at the ATM apparatus;
   reading account information stored on the physical card instrument; and
   receiving account verification information via the user input device.

4. The system of claim 3, wherein the first operations further comprise:
   verifying an account of a depositor of the physical currency based on the received account verification information; and
   based on the verifying, displaying, on the display screen of the ATM apparatus, information indicating a capability of the ATM apparatus to send payment to email addresses.

5. The system of claim 1, wherein determining that no existing receiving account corresponds to the email address comprises contacting a payment processor to request an account identifier for the email address.

6. The system of claim 1, wherein the email message notifies a payee of the amount of currency and identifies a payor of the amount of currency.

7. The system of claim 1, wherein the automatic teller machine is operated by an entity different than an entity that operates the networked server.

8. The system of claim 1, wherein the second operations further comprise querying a database maintained by an entity that controls the networked server in order to determine that no existing receiving account corresponds to the email address.

9. The system of claim 1, wherein a touchscreen comprises the display screen and the user input device.

10. The system of claim 1, wherein the first operations comprise:
presenting a display on the display screen allowing sending of funds to multiple different email addresses at one time.

11. A method, comprising:
receiving at an automatic teller machine (ATM) apparatus, a deposit of currency from a user, wherein the ATM apparatus comprises a display screen, a physical currency receiving device configured to accept physical currency, a user input device, and a first computing processor;
receiving, via the user input device of the ATM apparatus, an electronic funds transfer request specifying only an email address as an identifier for transfer of a specific amount of currency, the specific amount of currency comprising at least a portion of the deposit of currency, wherein the electronic funds transfer request does not identify a particular financial entity to receive the specific amount of currency;
determining, by a networked server, that no existing receiving account corresponds to the email address, wherein the networked server is configured to communicate with the ATM apparatus and comprises a second computing processor;
responsive to the determining, creating a holding account linked to the email address;
transmitting, from the networked server to an email server, an email message to the email address that includes one or more financial entities as linking options for the holding account;
receiving, at the networked server, an indication of a linking selection of a particular entity of the one or more financial entities;
based on the linking selection, transmitting, from the networked server to a computer system associated with the particular entity, an account creation request for the particular entity;
receiving an indication that a new currency-bearing account has been created responsive to the account creation request, wherein the new currency-bearing account is identified by a unique identifier within the ACH network; and
responsive to the indication, automatically transferring funds from the holding account to the new currency-bearing account over the ACH network using the unique identifier and not the email address.

12. The method of claim 11, wherein the deposit of currency from the user is in the form of physical currency.

13. The method of claim 11, further comprising crediting the deposit to an existing deposit account of the user.

14. The method of claim 11, further comprising:
verifying an account of the user based on received account verification information; and
based on the verifying, displaying, on the display screen of the ATM apparatus, information indicating a capability of the ATM apparatus to send payment to email addresses.

15. The method of claim 11, wherein determining that no existing receiving account corresponds to the email address comprises contacting a payment processor to request an account identifier for the email address.

16. The method of claim 11, wherein the email message notifies a payee of the amount of currency and identifies a payor of the amount of currency.

17. The method of claim 11, wherein the automatic teller machine is operated by an entity different than an entity that operates the networked server.

18. The method of claim 11, further comprising querying a database maintained by an entity that controls the networked server in order to determine that no existing receiving account corresponds to the email address.

19. The method of claim 11, wherein a touchscreen comprises the display screen and the user input device.

20. The method of claim 11, wherein the networked server comprises a plurality of networked computing devices.

* * * * *